United States Patent
Moreh et al.

(10) Patent No.: US 7,194,547 B2
(45) Date of Patent: *Mar. 20, 2007

(54) FEDERATED AUTHENTICATION SERVICE

(75) Inventors: Jahanshah Moreh, Los Angeles, CA (US); Terry Michael Olkin, Los Gatos, CA (US); Logan O'Sullivan Bruns, Napa, CA (US); Trevor Scott Perrin, Berkeley, CA (US)

(73) Assignee: Secure Data In Motion, Inc., San Mateo, CA (US)

( * ) Notice: Subject to any disclaimer, the term of this patent is extended or adjusted under 35 U.S.C. 154(b) by 22 days.

This patent is subject to a terminal disclaimer.

(21) Appl. No.: 11/163,596

(22) Filed: Oct. 24, 2005

(65) Prior Publication Data

US 2006/0075473 A1    Apr. 6, 2006

Related U.S. Application Data

(63) Continuation of application No. 09/827,697, filed on Apr. 7, 2001, now Pat. No. 6,959,336.

(51) Int. Cl.
*G06F 15/16* (2006.01)

(52) U.S. Cl. .............. 709/229; 709/225; 709/226; 709/203; 713/155; 713/156

(58) Field of Classification Search ............... 709/229, 709/225–226, 217–219, 202–203; 713/155–156
See application file for complete search history.

(56) References Cited

U.S. PATENT DOCUMENTS

| | | | | |
|---|---|---|---|---|
| 5,586,260 A * | 12/1996 | Hu | | 709/229 |
| 5,764,887 A * | 6/1998 | Kells et al. | | 713/156 |
| 6,067,623 A * | 5/2000 | Blakley et al. | | 707/9 |
| 6,104,716 A * | 8/2000 | Crichton et al. | | 370/401 |
| 6,286,104 B1 * | 9/2001 | Buhle et al. | | 709/229 |
| 6,324,648 B1 * | 11/2001 | Grantges, Jr. | | 709/229 |
| 6,510,464 B1 * | 1/2003 | Grantges et al. | | 709/225 |
| 6,606,663 B1 * | 8/2003 | Liao et al. | | 709/229 |
| 6,611,498 B1 * | 8/2003 | Baker et al. | | 370/252 |
| 6,668,327 B1 * | 12/2003 | Prabandham et al. | | 713/155 |
| 6,728,884 B1 * | 4/2004 | Lim | | 709/229 |
| 6,735,310 B1 * | 5/2004 | Hsing et al. | | 713/168 |
| 6,792,416 B1 * | 9/2004 | Soetarman et al. | | 707/3 |
| 6,826,696 B1 * | 11/2004 | Chawla et al. | | 713/168 |
| 6,892,307 B1 * | 5/2005 | Wood et al. | | 726/8 |
| 6,895,510 B1 * | 5/2005 | Benantar et al. | | 726/9 |
| 6,898,577 B1 * | 5/2005 | Johnson | | 705/51 |
| 6,918,041 B1 * | 7/2005 | Chen | | 370/235 |
| 7,016,875 B1 * | 3/2006 | Steele et al. | | 705/44 |
| 7,113,994 B1 * | 9/2006 | Swift et al. | | 709/229 |

(Continued)

*Primary Examiner*—Philip B. Tran
(74) *Attorney, Agent, or Firm*—Raymond E. Roberts; Intellectual Property Law Offices (57) ABSTRACT

A federated authentication service technology (10) for authenticating a subject (20) residing in a subject domain (12) on a network to a server application (38) residing in a server domain (18), wherein an authentication mechanism (32) residing in an authentication domain (16) affects the service provided by the server application (38). A client (22), which may be integrated non-human instances of the subject (20), authenticates the subject (20) and a protocol proxy (34) mediates with the authentication mechanism (32) to obtain a name assertion which the client can use to access the server application (38). When multiple authentication mechanisms (32) are available, an optional agent (24), mechanism resolution process (26) and mechanism repository (28), all residing in an agent domain (14), may be used to resolve to one suitable authentication mechanism (32).

18 Claims, 4 Drawing Sheets

U.S. PATENT DOCUMENTS

2001/0047484 A1* 11/2001 Medvinsky et al. ........ 713/201

2002/0144119 A1* 10/2002 Benantar .................... 713/171

* cited by examiner

FEDERATED AUTHENTICATION SERVICE

CROSS-REFERENCE TO RELATED APPLICATIONS

This is a continuation of application Ser. No. 09/827,697 filed Apr. 7, 2001 now U.S. Pat. No. 6,959,336.

TECHNICAL FIELD

The present invention relates generally to secure use of computerized networks, and more particularly to efficiently maintaining security in information systems when multiple authentication types and sources are used.

BACKGROUND ART

In today's digital world, information systems and their contents are among the most valuable of an organization's assets. Every year organizations spend significant amounts of money to protect their data from unauthorized access. Simultaneously, organizations have an overarching business requirement to share information with their partners, customers, suppliers, and even in some cases competitors and adversaries. This requires authentication.

The greatest value in authentication is when it forms the basis for enforcing access control rules. That is, in order for a system to determine what a subject can do the system must first ascertain who the subject is.

Traditional authentication systems generally presume a single authentication source and type. For example, in Kerberos the authentication source is a trusted key distribution center (KDC) and the authentication type is user IDs with passwords. [Version five of Kerberos supports initial authentication based on public keys, but a high percentage of commercial implementations of Kerberos authenticate based on a user ID and a password.] Another example is the public key infrastructure (PKI) system. Here the authentication source is a certificate authority (CA) and the authentication type is challenge/response. While both Kerberos and PKI permit multiple authentication sources, these authentication sources must be closely coupled. Often, this translates to complex trust relationships between the sources of authentication, which leads to solutions that are operationally infeasible and economically cost-prohibitive.

An emerging authentication system, and one which has particular importance later in this discussion is the secure remote password (SRP) protocol. In the words of SRP's advocates, inventor Tom Wu and Stanford University, "it solves the problem of authenticating clients to servers securely, in cases where the client must memorize a small secret (like a password) and carries no other secret information, and where the server carries a verifier which allows it to authenticate the client but which, if compromised, would not allow someone to impersonate the client." But SRP, like traditional authentication systems, also presumes a single authentication source and type.

A practical view of inter- and intra-organization communication reveals that there can never be a single authentication type. In fact, according to a report published in February 2001 by the Giga Group, companies will be supporting multiple authentication types, such as passwords, tokens, certificates and smart cards. Therefore, security architectures should include a single infrastructure for managing all of the authentication types, rather than a separate infrastructure for each. Even if there someday is a single authentication type (e.g. biometrics), there will always be multiple authentication sources, each having administrative control over a set of subjects.

It follows that information systems that seek to enforce access control must be prepared to accept authentication information from any number of sources. Indeed, key criteria for enforcing access control include the exact source and type of authentication. In a practical model the many authentication sources need to form a federation, each of whose members can ascertain the authenticity of a set of subjects.

What is needed is a technology that permits organizations to leverage authentication sources that belong to themselves, or to their customers, partners, suppliers, or any other third party. We can term such a technology a Federated Authentication Service Technology (FAST), and define its goal to be to enable organizations to quickly implement their business relationships through highly secure information systems.

DISCLOSURE OF INVENTION

Accordingly, it is an object of the present invention to provide a Federated Authentication Service Technology (FAST), to enable organizations to quickly implement their business relationships through highly secure information systems.

Another object of the invention is to provide an authentication system which permits the use of multiple authentication types and multiple authentication sources from different domains of control.

Another object of the invention is to provide an authentication system which permits an organization to change its authentication mechanism without affecting its users or servers.

Another object of the invention is to provide an authentication system which provides stringent security requirements while leveraging an organizations existing security infrastructure to quickly implement business relationships.

And another object of the invention is to provide an authentication system which permits users and service providers to choose where to authenticate.

Briefly, one preferred embodiment of the present invention is a system for authenticating a subject residing in a subject domain on a network to a server application residing in a server domain on the network when an authentication mechanism residing in an authentication domain on the network affects the service provided by the server application. The system includes a client to communicate with other components and to authenticate the subject by providing a client name assertion on behalf of the subject. The client also resides in the subject domain. The system further includes a protocol proxy to communicate between the client and the authentication mechanism and authenticate the client based on the client credentials, and to create from the client credentials an authentication name assertion allowing the client to access the server application.

An advantage of the present invention is that it permits multiple authentication types and sources by effectively abstracting these. Existing authentication technologies allow multiple authentication types (e.g., user id/password, biometrics, digital certificates, etc.). However, these existing technologies do not abstract multiple authentication sources (e.g., employer, financial institution, healthcare provider, etc.).

Another advantage of the invention is that it can authenticate with any mechanism server may choose. The authenticating mechanism of a server is completely independent of that of a client.

Another advantage of the invention is that it permits flexible credential expiration, requested by the client, the server application, or the authentication mechanism.

Another advantage of the invention is that it supports authentication from different domains, permitting a single, global sign-on.

Another advantage of the invention is that it provides a single location for managing credentials, providing easy administration and enabling the deployment of highly secure systems.

Another advantage of the invention is that it employs a highly secure inter-component protocol. This enables many different deployment scenarios and provides a basis for managed security services.

Another advantage of the invention is that it is authentication mechanism agnostic. It can protect an organization's investment in existing authentication mechanisms, yet permit seamless integration of future authentication mechanisms.

Another advantage of the invention is that it permits a hierarchy of trust. The invention requires authenticating mechanisms to authenticate themselves. In this manner a user need only reveal sensitive credentials to authentic mechanisms. Furthermore, a server application need only trust assertions of an authentic mechanism.

Another advantage of the invention is that it permits production and verification of signatures using Name Assertions. This eliminates the need to use digital certificates for production and verification of signatures, which improves the speed and efficiency of signature production and verification.

Another advantage of the invention is that it allows name assertions to be used as a basis to renew an existing name assertion. This eliminates the need to use digital certificates every time authentication is needed, which improves on the speed and efficiency of the authentication process.

Another advantage of the invention is that it is standards compliant. It promotes interoperability between applications and current and emerging security systems.

Another advantage of the invention is that it may employ and enhance the utility of the public key infrastructure (PKI) scheme. The invention turns long-lived digital certificates into ephemeral certificates (name assertions) therefore minimizing overall management and overhead. Specifically, the invention eliminates the need for servers to check certificate revocation lists (CRLs), a process that has plagued the proliferation of PKI.

Another advantage of the invention is that it may employ and enhance the utility of Kerberos, where the client has had to communicate with the Kerberos authentication mechanism every time the client contacts a specific server for the first time. Name assertions, as used by the present invention, are general and can be used to prove identity to any server. Therefore, a single valid name assertion can be presented to any server. This eliminates the need for the client to contact the authenticating mechanism every time it wants to communicate with a different server.

Another advantage of the invention is that it may employ and enhance the utility of secure remote password (SRP). SRP enables authentication of a client to a server, but it does not strongly authenticate the server to the client. The invention improves on this by implementing a strong, mutual authentication protocol.

Another advantage of the invention is that it permits a graceful migration path, unlike existing authentication technologies which require all user and servers to be enabled with that technology and which result in an all-or-none proposition for the entire enterprise. Using the present invention, an organization can change its authentication mechanism without affecting its users or servers.

And another advantage of the invention is that it is lightweight, its architecture permits a very lightweight implementation making it suitable for a wide variety of deployment scenarios.

These and other objects and advantages of the present invention will become clear to those skilled in the art in view of the description of the best presently known mode of carrying out the invention and the industrial applicability of the preferred embodiment as described herein and as illustrated in the several figures of the drawings.

BRIEF DESCRIPTION OF THE DRAWINGS

The purposes and advantages of the present invention will be apparent from the following detailed description in conjunction with the appended figures of drawings in which.

BEST MODE FOR CARRYING OUT THE INVENTION

A preferred embodiment of the present invention is a Federated Authentication Service Technology (FAST). As illustrated in the various drawings herein, and particularly in the view of FIG. 1, a preferred embodiment of the invention is depicted by the general reference character 10. To assist in understanding the following discussion, a glossary (Definition List 1) is also provided after the Industrial Applicability section.

Figure 1:
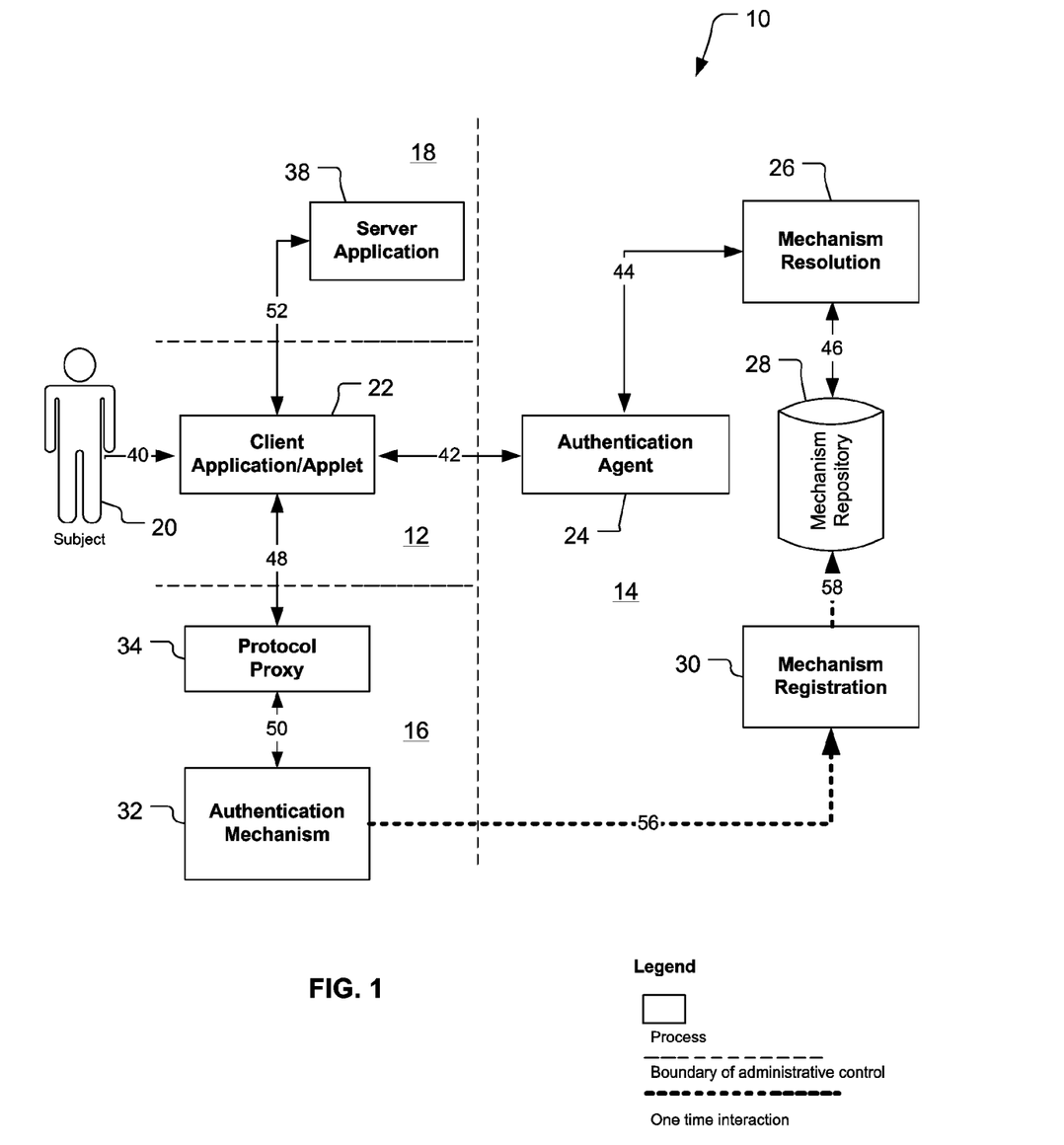
FIG. 1 is a block diagram depicting how the invention includes a set of cooperating components which execute in different administrative domains.

FIG. 1 depicts how FAST 10 includes a set of cooperating components which execute across different administrative domains in a network, with the boundaries depicted here with dashed lines. Thus, a subject domain 12 is stylistically depicted as bordering an agent domain 14, an authentication domain 16, and a server domain 18. The subject domain 12 includes a subject 20 (not necessarily human) and a client application or applet (client 22). The agent domain 14 includes an authentication agent 24, a mechanism resolution process 26, a mechanism repository 28, and a mechanism registration process 30. The authentication domain 16 includes an authentication mechanism 32 and a protocol proxy 34 (which may alternately reside in the authentication domain 16). The server domain 18 includes a server application 38.

From the subject domain 12 it is desired to obtain access to the server domain 18. Such access is predicated upon a successful authentication in the authentication domain 16, and the agent domain 14 facilitates the authentication. FIG. 1 and this description are simplified, somewhat, to present key points but, as will be described presently, in typical embodiments the FAST 10 will include a number of subjects 20, authentication mechanisms 32, and server applications 38, all employing the services of one authentication agent 24. When multiple entities of a similar type are present, they are each treated as respective domains.

Before describing FIG. 1 in more detail it will help to appreciate the role in FAST 10 of a core concept called "name assertion." A name assertion is a type of credential. More specifically, in actual implementation, it is a digitally signed data structure containing a declaration of identity which is presentable to establish a claimed identity.

FAST 10 preferably uses the secure remote password (SRP) protocol to authenticate an entity that presents a name assertion. In FAST 10 this is accomplished by including an SRP verifier in the name assertion, and then providing the SRP secret to the entity that must authenticate itself. Thus, for example, when a client 22 presents a name assertion to a server application 38, the server application 38 retrieves the SRP verifier from the name assertion and uses the SRP scheme to challenge the client 22 to prove possession of the SRP secret.

Turning now to a detailed description of FIG. 1, it depicts the overall flow of authentication in FAST 10. A series of steps, steps 40–52, encompass the actual authentication process and, generally but not always, occur every time a subject 20 must be authenticated to a server application 38. In contrast, steps 56–58 encompass a registration process that only need occur when an authentication mechanism 32 registers or updates itself to the agent domain 14 (changes the mechanism repository 28).

In step 40 the subject 20, who must authenticate itself, uses the client 22 to initiate the process of obtaining access to the server application 38. It should be noted that while the client 22 here is shown as distinct from the subject 20, that need not be the case if the subject 20 can have the functionality of the client 22 integrated into it, say, if the subject 20 is non-human.

In step 42 the client 22 contacts the authentication agent 24 and passes to it the name of the subject 20 and their domain. The client 22 can, optionally, also send the name of a particular authentication mechanism 32 and other data (typically including method and strength of authentication which the authentication mechanism can provide, if pertinent). A successful interaction between the client 22 and the authentication agent 24 produces information about exactly one authentication mechanism 32 for the client 22 to use. Otherwise, the authentication agent 24 returns an error condition indicating that no authentication mechanism 32 matches the request by the client 22.

In step 44 the authentication agent 24 uses the mechanism resolution process 26 to determine an appropriate authentication mechanism 32 for the client 22. If there is more than one which is appropriate, the authentication agent 24 uses its protocol with the client 22 (step 42 above) to resolve to exactly one authentication mechanism 32.

In step 46 the mechanism resolution process 26 uses the mechanism repository 28 to retrieve information about appropriate authentication mechanisms 32. This information could then be passed back to the client 22 for final mechanism resolution.

In step 48 the client 22 communicates an authentication request for access to the server application 38 to the protocol proxy 34 using a standard secure protocol. It should be noted that this need not go via the authentication agent 24 or any part of the agent domain 14 (but that it may optionally do so, being passed-thru in a manner described presently).

In step 50 the protocol proxy 34 receives the authentication request from the client 22 and translates it into the native protocol of the authentication mechanism 32. Consequently, there can be one protocol proxy 34 for each type of authentication mechanism 32. The protocol proxy 34 next communicates the translated request to the authentication mechanism 32. Upon successful authentication, the protocol proxy 34 receives back from the authentication mechanism 32 a response including attributes and access rights of the subject 20. The protocol proxy 34 then creates a name assertion and, optionally, entitlements. The protocol proxy 34 translates this into an authentication response which it transmits back to the client 22.

In step 52 the client 22 delivers the authentication response to the server application 38. The client 22 and the server application 38 then engage in a protocol that proves the client 22 is the proper owner of the name assertion.

As noted, the above steps 40–52 generally (but not always) occur every time a subject 20 must authenticate itself to a server application 38. To the extent that name assertions are re-usable the subject 20 can present it to any server application 38, any number of times. To initially register an authentication mechanism 32 the following steps 56–58 are used.

In step 56 the authentication mechanism 32 contacts the mechanism registration process 30 to initiate registration.

In step 58 the mechanism registration process 30 enters information about the authentication mechanism 32 into the mechanism repository 28, and thereafter the steps 40–52 may be employed. The protocol proxy 34 may already be available to the authentication mechanism 32, or it can be provided or made available by the mechanism registration process 30 during these registration steps.

Each of the components of FAST 10 has a protocol which it employs when communicating with the others within FAST 10. The subject 20 uses an environment-specific device to authenticate itself. FAST 10 is environment-agnostic, so a subject 20 may authenticate in any environment using any type of credential. Some examples of such credentials include user ID/passwords on a computer or a hand-held device, digital certificates and an associated private key, and biometric data such as a fingerprint or iris-scan.

The client 22 is an application or an applet that helps the subject 20 authenticate itself. The clients 22 run in environment-specific platforms and interact with devices that produce the necessary credentials. For example, a client 22 may interact with a biometric device to gather fingerprint data.

The subject 20 may obtain the client 22 in a number of different manners. For example, it may be pre-provisioned with the client 22 or it may down load it "on the fly" from the authentication agent 24, the server application 38, or elsewhere.

As was noted above, the client 22 interacts with the authentication agent 24 in order to determine the most appropriate authentication mechanism 32. The authentication agent 24 can return more than one appropriate authentication mechanism 32. The client 22 therefore may have a callback mechanism to enable local determination of exactly which authentication mechanism 32 it should use. For example, the callback mechanism can interact with the subject 20 to determine this or it may consult a configuration repository.

The authentication agent 24 brokers between the client 22 and the mechanism resolution process 26. The client 22 must minimally send the authentication agent 24 the name and the domain of the subject 20, but it may optionally also send other information. The authentication agent 24 uses this information to resolve to an appropriate authentication mechanism 32. The authentication agent 24 then returns information identifying authentication mechanisms 32 to the client 22. If more that one is supplied, the client 22 uses its callback mechanism to select exactly one.

A specific scenario provided for is when the client 22 chooses the authentication mechanism 32 without the help of the authentication agent 24. For example, the client 22, through its interaction with the subject 20 may choose an authentication mechanism 32. In this case the client 22 has two choices. First, the client 22 may send a request for the specific authentication mechanism 32 it desires to the authentication agent 24. Subsequently, the authentication agent 24 merely checks to ensure that the authentication mechanism 32 can indeed authenticate the subject 20. Second, the client 22 may directly contact the protocol proxy 34 to start the authentication process with the authentication mechanism 32, and thus effectively bypass the mechanism resolution process 26.

The mechanism resolution process 26 is a "black-box" process. In the preferred embodiment, it receives an input document in XML format and produces a list of zero or more appropriate authentication mechanisms 32. The input document minimally consists of the name of the subject 20 and their domain. The input document can be expanded to include any other data (e.g., an authentication strength) that can help choose the set of authentication mechanisms 32. For instance, consider a subject 20, John Doe, who has a work account at "A.com," and various other accounts with "B.com," "C.com," etc. Mr. Doe may need to access the resources of Z.com in his work capacity, and therefore needs to authenticate as "JohnDoe@A.com." This will require resolution to an appropriate authentication mechanism 32 for Z.com, for instance, may be set up with a mask "*@A.com" to direct resource requests to use a particular authentication mechanism 32.

The mechanism repository 28 is a database that contains information about authentication mechanisms 32. It should be noted that a "mechanism" specifies exactly how to contact and work with the protocol proxy 34 of each authentication mechanism 32, e.g., what URL to use to reach it, etc. The mechanism resolution process 26 and the mechanism registration process 30 use the mechanism repository 28 to resolve and to register the authentication mechanisms 32, respectively.

The mechanism registration process 30 is what the authentication mechanisms 32 use to register themselves or to modify information about themselves in the mechanism repository 28. As compared to authentication, the mechanism registration process 30 happens infrequently.

Each protocol proxy 34 mediates between its authentication mechanism 32 and the clients 22. In the preferred embodiment, the protocol proxies 34 use a standard security protocol expressed in XML to communicate with the clients 22, and a mechanism-specific protocol to communicate with their respective authentication mechanisms 32. At the end of a successful authentication, a protocol proxy 34 produces a signed document including a name assertion and, optionally, an entitlement. Examples are provided in Appendix A.

Each protocol proxy 34 must itself be authentic and have a valid name assertion. In this manner, the client 22 has to only reveal sensitive credentials to an authentic protocol proxy 34. Moreover, a server application 38 has to only trust name assertions that are produced by an authentic protocol proxy 34. A protocol proxy 34 therefore uses its own name assertion to authenticate to a client 22 and to sign the name assertions and entitlements which it produces on behalf of its authentication mechanism 32. (This is described further, below.)

The authentication mechanism 32 is a process that authenticates a subject 20 according to a specific protocol. Note, however, the protocol proxy 34 hides the specific protocol of the authentication mechanism 32 used for this from the subject 20 and the client 22. Thus, the authentication mechanism 32 may be entirely conventional, yet still be able to function with an overall scheme of multiple authentication types and sources, that being a major benefit provided by the inventive FAST 10.

Each name assertion contains a SRP verifier. The rightful owner of the name assertion possesses the corresponding SRP secret. Using the SRP verifier and the SRP secret, any two parties can authenticate each other using the SRP protocol. In FAST 10 the SRP protocol is extended to enable mutual authentication between any two parties (e.g. client 22 and server application 38, client 22 and protocol proxy 34, etc.).

Each name assertion contains a set of public values. In FAST 10 the use of these public values is extended for signature verification. That is, the owner of the name assertion can use its SRP secret to authenticate itself and to produce a digital signature. The party to whom the owner presents the name assertion can then use it to authenticate the owner and to verify the digital signature of the owner.

Because the name assertion itself is signed by the protocol proxy 34 that produces it, the signature of the owner is bound to its authenticated identity. Additionally, because name assertions are ephemeral, there is no requirement for certificate revocation lists (CRL). Note that an authentication mechanism 32 that uses digital certificates to authenticate its subjects 20 can trivially set the name assertion validity period to coincide with the production of the next CRL. In this manner the subject 20 must re-authenticate itself on or before the publication of the next CRL.

The clients 22 need to trust the protocol proxies 34 (which represent the authentication mechanisms 32). This is especially true in the case of a protocol proxy 34 that receives secret credentials from a client 22. The protocol proxies 34 therefore authenticate themselves to a mechanism-authenticating mechanism. This type of authentication is identical to a client 22 authenticating with any authentication mechanism 32. The result is a name assertion that the protocol proxy 34 uses to engage in mutual authentication with the client 22 and to sign name assertions for the clients 22 it authenticates.

When a protocol proxy 34 authenticates with a mechanism-authenticating mechanism, it receives a name assertion in the same manner that any client 22 would. Such a name assertion is signed by the mechanism-authenticating mechanism (or, more precisely, by the protocol proxy 34 ahead of the mechanism-authenticating mechanism that mediates between the protocol proxy 34 needing to be authenticated, i.e., itself temporarily acting in the role of a client 22). A client 22 can verify the digital signature of the name assertion of the protocol proxy 34 to ascertain its authenticity, as provided by the mechanism-authenticating mechanism. This is similar to verifying a chain of digital certificates, except that in this case, name assertions and certificates are combined to provide a practical solution where all parties need not have digital certificates (only the mechanism-authenticating mechanism would need a digital certificate).

Recall that the client 22 first establishes contact with the protocol proxy 34. In actual implementation it would be very beneficial if the client 22 can view the authentication agent 24 as the protocol proxy 34. This is, in fact, possible in FAST 10, with the reason for that being that the protocol proxy 34 and the client 22 can establish a mutually authenticated session whose protocol data is completely hidden from any process that acts as a pass-thru. That is, the authentication agent 24 can act as a transparent protocol proxy 34. In this case, the authentication agent 24 acts as a pass-thru. This provides convenience and efficiency for the client 22, which behaves as if it is dealing with one server (the authentication agent 24), while preserving the overall security of the authentication process.

In FAST 10 authentication types and sources are abstracted. It is therefore possible to develop protocol proxies 34 that can facilitate the authentication of any subject 20 with any authentication mechanism 32. Four authentication types and their implementations in FAST 10 are now described.

The first implementation to consider uses a user ID and secret credentials. This is a variation on the most popular form of authentication employed today. Here, the user (subject 20) presents a secret credential to the protocol proxy 34. The secret credential could, for instance, be a password or biometric data.

FAST 10 implements this authentication type by establishing a secret link between the protocol proxy 34 and the client 22. This secret link is irrespective of any other communication intermediaries. That is, a process that is acting as pass-thru between the client 22 and the protocol proxy 34 cannot discern the data.

The client 22 and the protocol proxy 34 establish the secure link as follows. First, the client initiates a dialog with the protocol proxy 34. Second, the protocol proxy 34 presents its own name assertion to the client 22. Third, the client 22 uses the verifier in the name assertion it receives to authenticate the protocol proxy 34 via the SRP method. Fourth, the client 22 and the protocol proxy 34 establish a secured link via the SRP method.

Once the client 22 establishes the secured link with the protocol proxy 34, it delivers the credentials and, upon successful authentication, receives a name assertion from the protocol proxy 34.

The second implementation to consider uses verifier-based authentication. In this form of authentication the client 22 proves possession of a secret credential to the protocol proxy 34. The protocol proxy 34 has a verifier that matches the secret credentials of the client 22. In the preferred embodiment of FAST 10 this authentication type is implemented using SRP with mutual authentication (as discussed above).

The third implementation to consider uses digital certificates in a PKI scheme. Authentication using digital certificates does not require a secret link. The protocol proxy 34 uses a standard challenge/response protocol to prove possession of private key by the client 22. Upon successful authentication, the client 22 receives a name assertion from the protocol proxy 34.

The fourth implementation to consider uses a previously issued name assertion. Each name assertion contains a verifier whose corresponding secret is maintained by the owner of the name assertion (i.e., the client 22). A client 22 who has a valid name assertion authenticates with the protocol proxy 34 using SRP with mutual authentication.

While the above generally summarizes the invention, FAST 10 may incorporate additional capabilities. One of these is strength of authentication. A client 22 can specify the strength with which it wants to authenticate itself. This data is an input to the mechanism resolution process 26. Conversely, each name assertion has a strength indicator, which indicates to a server application 38 the strength with which the subject 20 actually authenticated itself. The clients 22 can specify other environmental variables as part of the request to authenticate. These variables are input to the mechanism resolution process 26. The name assertions have an expiration time, but a client 22 can renew its name assertion if it can prove ownership of it, and if the renewal count or time period in the original name assertion permits further renewal.

FAST 10 does not require special provisions for authenticating to multiple mechanisms. Instead, this capability is implemented by simply requiring that the client 22 authenticate with each authentication mechanism 32 and receive a separate name assertion.

Two examples of embodiments of FAST 10 are now provided. Each is a practical (but different) deployment scenario. Co-operating partners requiring cross-organization authentication is the context of the first example.

Figure 2:
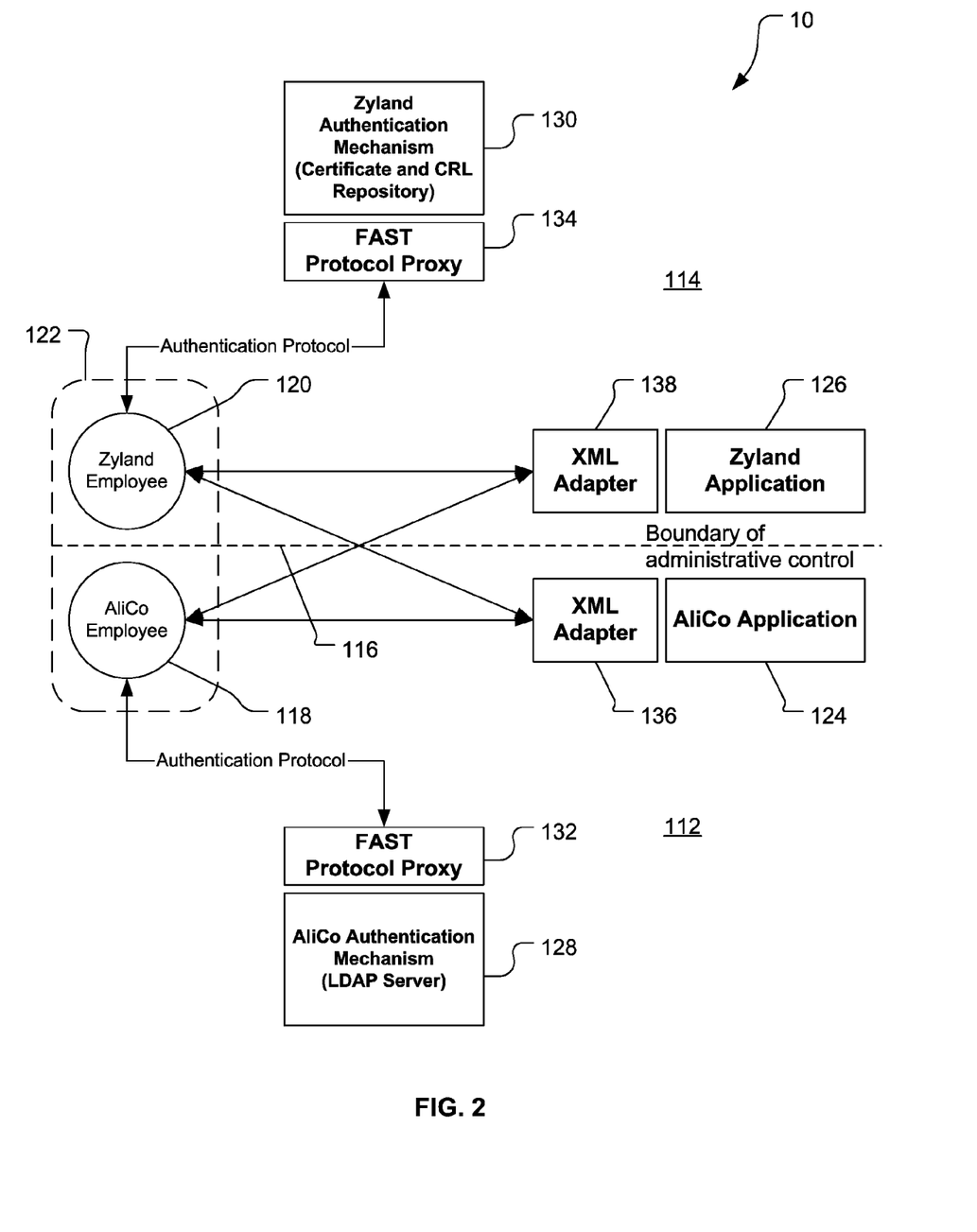
FIG. 2 is a block diagram depicting an example of how the invention may be applied by two companies for collaboration in the development of a new product.

FIG. 2 is a block diagram depicting the inventive FAST 10 in use by two companies collaborating with each other on the development of a new product, AliCo 112 and Zyland 114 (any similarity to actual businesses is purely coincidental). AliCo 112 and Zyland 114 are represented as regions lying on respective sides of an administrative control boundary 116. Both companies have employees, stylistically shown respectively as an a-employee 118 and a z-employee 120 (instances of the subject 20 of FIG. 1; the presence of clients, etc. is also implicit here, since humans cannot directly access information systems). These employees 118, 120 collectively form a project team 122.

For this example, we presume that the relationship between AliCo 112 and Zyland 114 is not a permanent one, but that they do have an extremely tight product development cycle. Accordingly, for the duration of the project the members of the project team 122 require access to the information system of their partner company. That is, the a-employee 118 and the z-employee 120 need to use the tools of both companies, stylistically shown as an a-application 124 and a z-application 126.

AliCo 112 has an a-authentication mechanism 128 and Zyland 114 has a z-authentication mechanism 130 (instances of the authentication mechanism 32 of FIG. 1). These authenticate the company's respective users (employees 118, 120 and potentially many others not pertinent to this example). The a-authentication mechanism 128 used by AliCo 112 is an LDAP directory with user IDs and passwords. In contrast, the z-authentication mechanism 130 used by Zyland 114 is digital certificates and associated certificate revocation lists (CRL). Additionally, both AliCo 112 and Zyland 114 use their own internal systems to manage the entitlements of their respective employees.

Existing solutions to this problem would require one or more of the following: the members of the project team 122 individually registering with the authentication mechanism 128, 130 of the partner company; the members of the project team 122 having a set of entitlements in the repository of the partner company; and the software tools (applications 124, 126) in both companies understanding the authentication protocol of the partner company (e.g., the applications must be PKI-enabled or Kerberized).

This quickly becomes unwieldy. When one company revokes the credentials or changes the entitlements of an employee it must promptly inform its partner. The partner must then promptly reflect that change in its own repository. Changing the software tools, either by outright addition or by upgrade, also may be effected.

Allegedly simpler solutions would require each member of the project team 122 to obtain a digital certificate from a commonly trusted certificate authority (CA). However, even if digital certificates could be obtained and managed easily, such certificates cannot practically store entitlement information. For example, any modifications to the entitlement would invalidate the certificate. This is why there are long-lived identity certificates and short-lived attribute certificates in the PKI scheme, and why more than 99% of all certificates in use today are identity certificates.

Now consider the solution using FAST 10, as depicted in FIG. 2. AliCo 112 and Zyland 114 would deploy small software protocol proxies 132, 134 (i.e., instances of the protocol proxy 34 of FIG. 1) at their authentication source, and a standard XML adapter 136, 138 in front of their applications 124, 126 (for this example we presume that the applications 124, 126 are not able to directly handle name assertions and need the adapter 136, 138 for this). Immediately thereafter, the a-application 124 of AliCo 112 will recognize the z-employee 120 of Zyland 114, and can determine his or her entitlements. And the reverse is also true. If one company revokes the credentials or changes the entitlements of one its users, the other company will know it as soon as the next authentication attempt occurs.

Before closing with FIG. 2, it should be noted that it depicts a simple embodiment of the inventive FAST 10, in that no equivalent of the agent domain 14 and its components is depicted. Since the employees 118, 120 on the project team 122 here are only accessing the applications 124, 126 of the partner company, they will easily know the respective authentication mechanism 128, 130 need and not require the assistance of an agent in resolving one.

Many organizations today are outsourcing their security services to outside managed security services providers (MSSPs). The challenge of MSSPs then is to streamline their operation and realize the economy of scales. This provides the context of the next example.

Figure 3:
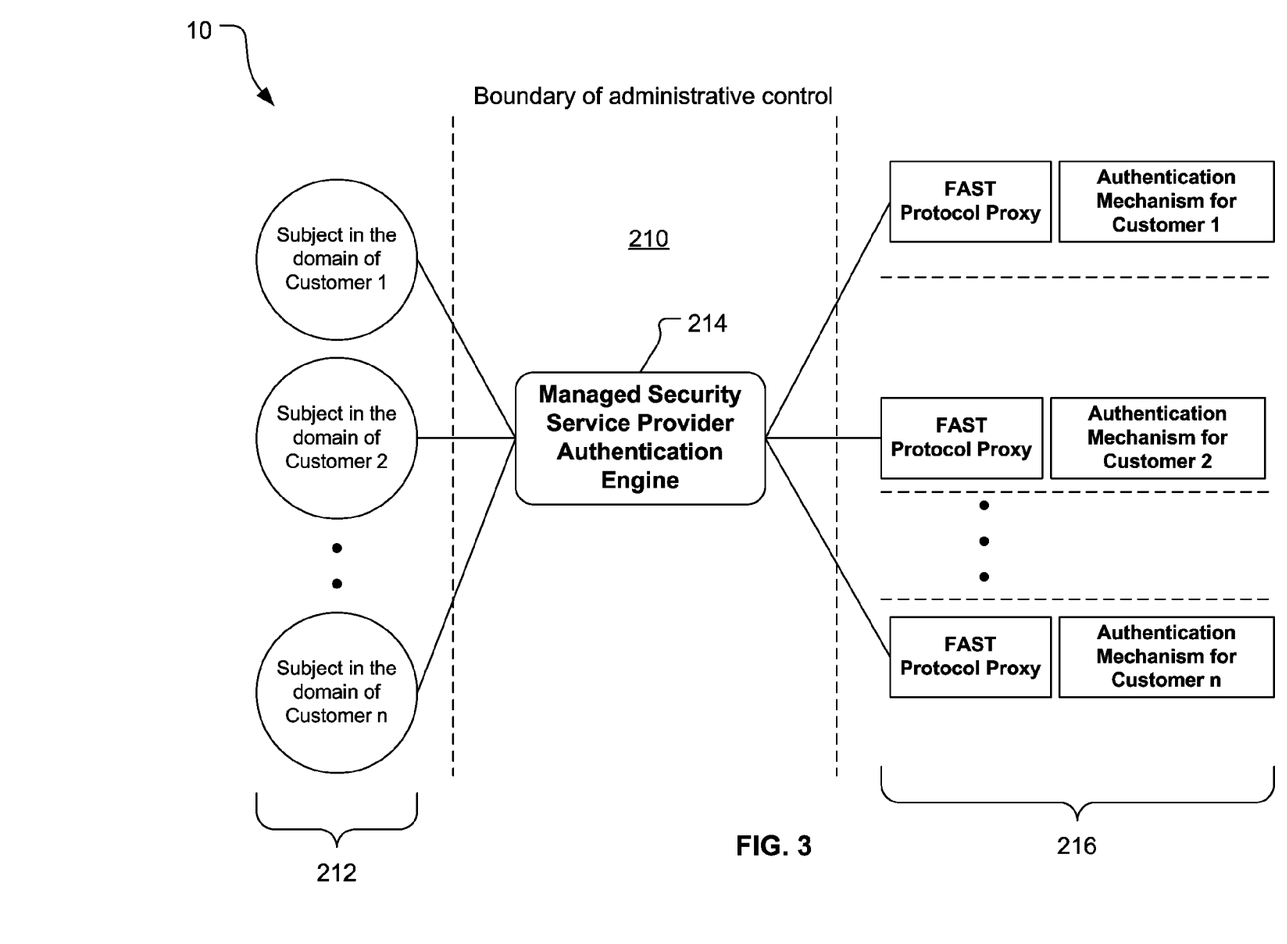
FIG. 3 is a block diagram depicting an example of how the invention may be applied by an outside managed security services provider (MSSP) to provide authentication for customers.

FIG. 3 is a block diagram depicting the inventive FAST 10 providing authentication for a MSSP 210. In this second example, the MSSP 210 needs to support several types of authentication types across several hundreds of customers 212 (entities including instances of the subject 20 of FIG. 1). While the MSSP 210 wants to manage the authentication process, it does not want to be the source of authentication. Nor does it want to be in a position to see sensitive credentials (e.g., passwords). This provides a number of benefits to the MSSP 210 and its customers 212. The MSSP 210 can support any customer 212, even those with extremely high security requirements. It can also provide an incremental solution, migrating customers 212 from a minimally managed to a totally managed solution. Not having to see credentials also reduces the legal liabilities of the MSSP 210 arising from any security breaches. It also helps the MSSP 210 to a void costly implementations of chain-of-trust rules.

Legacy solutions to this problem require that the MSSP 210 set up a completely separate and trusted system for each customer 212. The MSSP 210 must then protect each system with the rigor that meets the demands and expectations of each customer 212. Most importantly, the solution is all-or-none, inhibiting an incremental deployment.

Now consider the solution with FAST 10, as depicted in FIG. 2. The MSSP 210 can deploy a single authentication engine 214 for managing authentication for all of its customers 212. The actual authentication source can be at the customer 212, at the MSSP 210, or at a third place (e.g., the authentication domains 216 shown). In fact, the authentication source can move its location and change its administrative authority (from the customer 212 to the MSSP 210 or vice versa) with no effort at all.

In the example in FIG. 3, the authentication sources (paired instances of the protocol proxy 34 and the authentication mechanism 32 of FIG. 1) are depicted as being at a third place. This arrangement has deliberately been used in FIG. 1 and FIG. 3 to emphasize the fact, and the ability of FAST 10 to accommodate that fact, that the authentication sources may be quite removed from the users and tools (instances of the subject 20 and server application 38 of FIG. 1).

Figure 4:
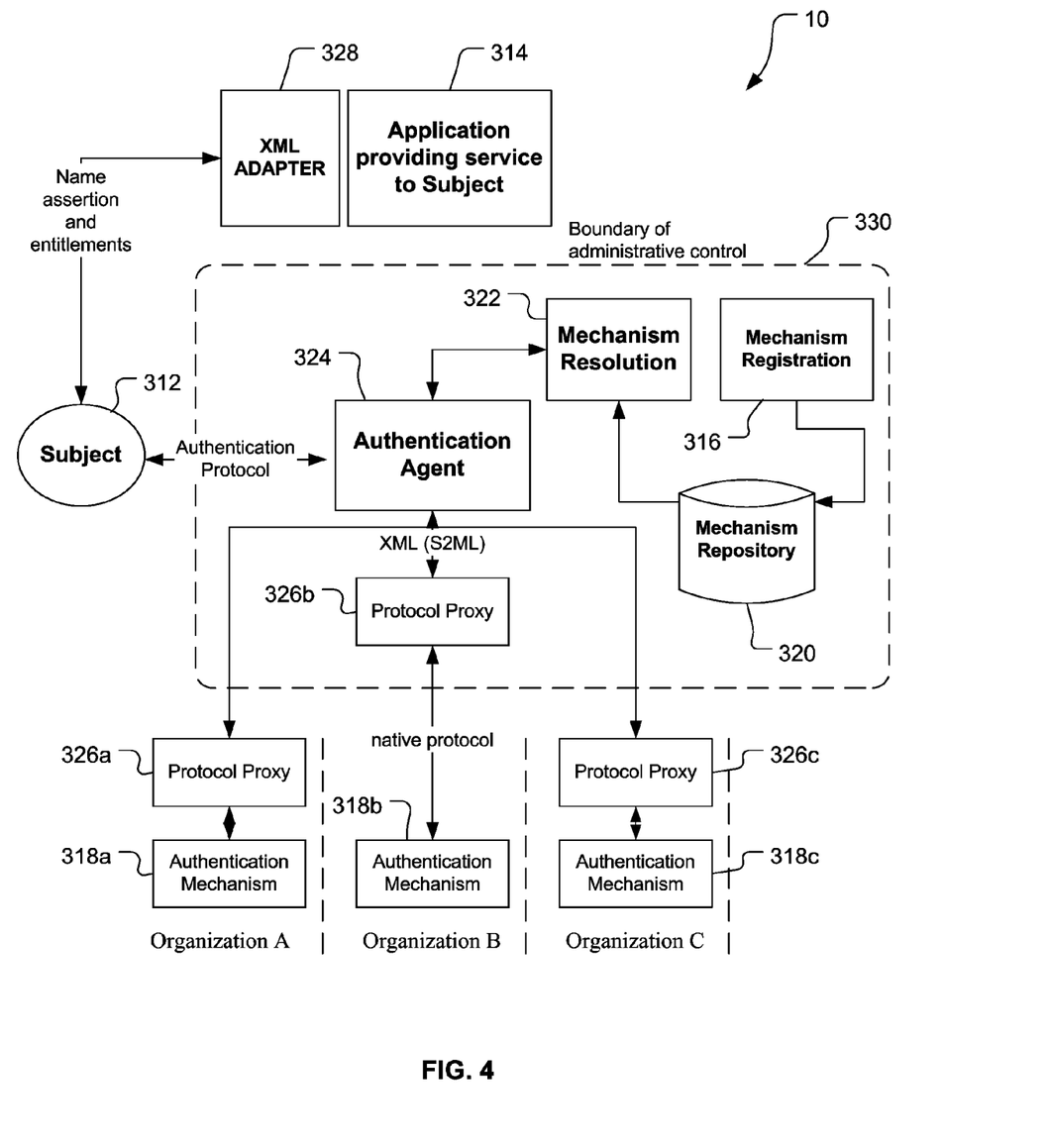
FIG. 4 is a block diagram that also depicts how the invention includes a number of interacting components, expanding on FIG. 1 by also showing various options and usage with multiple authentication mechanisms.

Turning now to FIG. 4, a summary of FAST 10 is now discussed. The word "federated" has two specific meanings herein: a system is federated if it supports multiple authentication types, and multiple authentication sources. Prior art approaches address multiple authentication types but largely ignore multiple authentication sources. Thus, the resulting products can support many authentication types for a single organization but cannot support inter-organization authentication. In this discussion we use the word "mechanism" to refer to a specific authentication type at a specific authentication source.

FIG. 4 is a block diagram that again depicts how FAST 10 includes a number of interacting components, extending somewhat on FIG. 1. A subject 312 is the entity that needs to authenticate itself (user, device, etc.; again the presence of a client is implicit here, and one may even be integrated into a non-human subject 312). A server application 314 provides service to the subject 312. In order to do so the server application 314 must know the authenticated identity of the subject 312, and possibly the entitlements of the subject 312. A mechanism registration module 316 performs the process that binds the authentication mechanisms 318*a*, 318*b*, 318*c* to the subjects 312 (e.g., all users at alico.com must authenticate against Idapserver.alico.com). A mechanism repository 320 is the database that holds information about mechanisms such as their location, type, credentials (e.g., a digital certificate), and protocol. A mechanism resolution module 322 performs the process that resolves the name of a subject 312 to one or more mechanisms. An authentication agent 324 is the process that finds the proper authentication mechanism and facilitates the authentication protocol between the subject 312 and a protocol proxy 326*a*, 326*b*, 326*c*. The protocol proxies 326*a*, 326*b*, 326*c* are the interface between the authentication agent 324 and the authentication mechanisms 318*a*, 318*b*, 318*c*.

There is one protocol proxy per specific authentication type (e.g., and LDAP user ID/Password proxy). The protocol proxy can co-reside with either the authentication mechanism or the authentication agent, resulting in possible different deployment scenarios. An authentication mechanism is the specific mechanism, embodying the authentication type and location of authentication. In FIG. 4 the protocol proxies 326*a*, 326*c* reside, respectively, with the authentication mechanisms 318*a*, 318*c*; and the protocol proxy 326*b* resides with the authentication agent 324.

If a subject 312 wants to use a server application 314, the process begins with the subject 312 contacting the authentication agent 324. The authentication agent 324 uses the mechanism resolution module 322 to process and resolve the name of a subject 312 (e.g., james@alico.com) to an authentication mechanism 318*a* (for instance). The authentication agent 324 then uses the protocol proxy 326*a* (used as an example now) to facilitate passing of credentials between the subject 312 and the authentication mechanism 318a. Note that the authentication agent 324 does not see any sensitive credentials that the subject 312 passes to the protocol proxy 326a (e.g., passwords). The subject 312 and the protocol proxy 326a each establish a secure tunnel. Thus, for mechanisms that require knowledge of sensitive credentials it is best to co-locate the proxy at the authentication mechanism, as is shown in FIG. 4 for the authentication mechanism 318a and protocol proxy 326a.

The subject 312 and the protocol proxy 326a engage in the process of authentication. If the subject 312 is authentic, then the protocol proxy 326a produces a digitally signed document consisting of a name assertion and entitlements. In the inventors' presently preferred embodiment, the actual format of the document is according to the security services markup language (S2ML), which is a draft XML standard for communicating security information. Once the subject 312 receives the S2ML document it can pass it to any application that understands the simple S2ML elements and attributes. If necessary, for any application (e.g., the server application 314 in FIG. 4) that does not understand S2ML, an XML adapter 328 can be used to provide this capability.

The power of FAST 10 lies in its simplicity and in its inherent security. Components of FAST 10 can be deployed in a number of ways, yielding deployment scenarios that simultaneously meet security and business requirements of organizations.

The mechanism resolution module caries out a process which takes into account the environment within which the subject is operating. For example, asking the subject for credentials through a hand held device would be more different than obtaining such with a retina-scanning device. Thus, a subject can authenticate in whatever manner desired, leading to a more positive experience.

The authentication mechanisms need not be modified. Instead, the protocol proxies interface between the authentication agent and the authentication mechanisms. As a result, organizations can quickly leverage their existing authentication mechanisms, leading to cost savings and protection of their investments.

Authentication is decoupled from the applications. This permits organizations to change their underlying authentication mechanisms, either incrementally or all at once, without ever needing to modify their own or third party applications used by their own subjects.

The authentication mechanisms run at the location that owns them (i.e., within their boundary of administrative control). The exchange of information between an authentication mechanism and a subject is private. Therefore, the authentication agent can never see or steal sensitive credentials.

The subjects need not be just human users. They can be applications, devices, processes, etc. As a result, FAST 10 is applicable in multiple environments, involving human and non-human subjects.

Because the components of FAST 10 can run anywhere, and because these components can be under different domains of control, it is imperative that each individual component be secure, both internally and in its communication with other components. This total security of FAST 10 is now discussed.

With continued reference to FIG. 4, the authentication agent 324 mediates authentication requests and responses between the subject 312 and the protocol proxy 326a. However, in no case can the authentication agent 324 view secret credentials. The reason for this is that the subject 312 and the protocol proxy 326a set up a secret key that is not known to the authentication agent 324. Additionally, the authentication agent 324 cannot modify the result of the authentication (the S2ML name assertion and entitlement). The reason for this is that the protocol proxy 326a digitally signs the authentication response.

In the example of the FAST 10 depicted in FIG. 4, a dashed line depicts the boundary of the agent domain 330 and it can be seen that all communication between the subject 312 and the protocol proxies 326a, 326b, 326c passes through the agent domain 330. Nonetheless, even this arrangement is secure for the reasons just described.

The protocol proxy establishes a secure protocol with the subject 312. The protocol proxy can run co-resident with the authentication agent 324 (as protocol proxy 326b does in FIG. 4), or co-resident with an authentication mechanism (as protocol proxy 326a does with the authentication mechanism 318a in FIG. 4). If the subject 312 is supplying sensitive credentials, it is best for the protocol proxy to run co-resident with the authentication agent 324.

The protocol proxies produce signed S2ML name assertions and entitlements. The subject 312 can use the S2ML document to authenticate to any server (e.g., the server application 314). In this respect, there is an important difference between FAST 10 and other authentication architectures. In other authentication architectures (e.g., Kerberos) the name assertion is targeted for a specific server. As such, the server cannot steal the name assertion. However, the subject in such a scheme would need a different name assertion for every server.

In order to protect the S2ML document from being replayed or stolen, the protocol proxy delivers a SRP secret to the subject, and includes a SRP verifier for the server application in the S2ML document. In this manner the server can always verify that the subject was the original and intended recipient of the S2ML document, but the server can never use the S2ML document to pose as the subject. In summary, the S2ML name assertion and entitlement is analogous to a digital certificate that the application server can only use to authenticate the subject.

The authentication mechanisms do not directly communicate with any other component of FAST 10. Instead, the protocol proxies are the interface between the authentication mechanisms and the other components of FAST 10. Thus, the communication between a protocol proxy and an authentication mechanism can be as secure as desired.

FAST 10 may employ widely used and trusted security industry standards. For instance, X.509 version 3 digital certificates may be used. The components of FAST 10 can use such digital certificates as the basis for SSL/TLS connections and for digital signature verification. As noted above, security services markup language (S2ML) may also be used. The protocol proxies can produce XML documents that comply with S2ML schema. XML digital signatures are another standard which may be used. FAST 10 may use XML-signature specifications for production of digital signatures in S2ML name assertions and entitlements. The use of the secure remote password (SRP) standard permits FAST to uses the SRP authentication and key exchange system, as specified in RFC 2945. Furthermore, the enhanced version of SRP described herein provides additional benefits. FAST 10 may also use various standard encryption and message digest algorithms for protecting the privacy and integrity of its protocol data. These may include Diffie-Hellman, RSA, AES, SHA-1, and keyed-hashing for message authentication, as defined in RFC 2104.

The ability to share information across enterprise boundaries enables organizations to create inter-enterprise business and to gain a competitive advantage. Simultaneously, information constitutes an important corporate asset and must be protected commensurate with its value. In order to protect information, organizations need to ascertain the identity of users.

In the real world each one of us is known and authenticated in many ways. Our friends and families know us by our voices or likeness, financial and legal institutions know us by our signatures and officially issued identifications, and law enforcement institutions know us by our fingerprints.

Global single sign-on does not mean a single source of authentication, nor does it mean a single type of authentication. It is the effective use of multiple, federated authentication sources that ultimately leads to global single sign-on.

FAST 10 is the only technology today that permits use of multiple authentication types and multiple authentication sources from different domains of control. By using FAST 10, organizations can satisfy the most stringent security requirements while leveraging their existing information systems to quickly implement business relationships.

While various embodiments have been described above, it should be understood that they have been presented by way of example only, and not limitation. Thus, the breadth and scope of the invention should not be limited by any of the above described exemplary embodiments, but should be defined only in accordance with the following claims and their equivalents.

INDUSTRIAL APPLICABILITY

The present FAST 10 is well suited for use to authenticate subjects 20, 118, 120, 212, 312 to server applications 38, 124, 126, 314. As shown in FIG. 2, this can be on a small scale, for just a few subjects and server applications, or this can be on a very large scale, for potentially thousands, as depicted in FIG. 3. These are current needs which FAST 10 well serves, and ones which FAST 10 may be immediately implemented to serve.

FAST 10 permits the use of multiple authentication types and multiple authentication sources from different domains of control, regardless of how disharmonious these may be. FAST 10 simply abstracts both authentication type and source. Accordingly, organizations can satisfy the most stringent security requirements, choosing security infrastructure as they wish or leveraging their existing ones to quickly implement business relationships.

The ability to support multiple types of authentication permits organizations to deploy one authentication type and migrate to other types as desired, say, as their needs grow or as more robust types emerge. Existing authentication technologies, such as Kerberos or public key infrastructure, require all users and servers to be enabled with that technology. The result is an all-or-none proposition for the entire enterprise. Using FAST 10, an organization can change its authentication mechanism without affecting its users or servers.

The ability to support multiple authentication sources permits users and service providers to choose where to authenticate. For example, in order to pay a bill a user would have to authenticate with his bank. However, in order to view medical records a user would have to authenticate with her healthcare provider, or perhaps her employer.

FAST 10 permits production and verification of signatures using name assertions. This eliminates the need to use digital certificates for production and verification of signatures, which improves the speed and efficiency of signature production and verification. Name assertions may be used as a basis to renew an existing name assertion. This eliminates the need to use digital certificates every time authentication is needed, which improves on the speed and efficiency of the authentication process.

As has been described, FAST 10 may employ and enhance the utility of Kerberos, the public key infrastructure (PKI) scheme, or particularly the secure remote password (SRP) protocol, improving upon it by implementing a strong, mutual authentication protocol.

FAST 10 is inherently secure. It permits a hierarchy of trust wherein authenticating mechanisms must authenticate themselves. In this manner, a subject need only reveal sensitive credentials to and only trust assertions of an authentic mechanisms. FAST 10 also permits flexible credential expiration, overcoming limitations of prior architectures, which are rigid about who sets the expiration time of credentials. FAST 10 permits credential expiration to be requested by the client, the server, or the mechanism.

For the above, and other, reasons, it is expected that the FAST 10 of the present invention will have widespread industrial applicability. Therefore, it is expected that the commercial utility of the present invention will be extensive and long lasting.

Definition List 1

| Term | Definition |
| --- | --- |
| Authentication Agent | A process that facilitates authentication between a Subject and an Authentication Mechanism. The Authentication Agent itself never authenticates a Subject. |
| Authentication Mechanism | A process that authenticates a Subject according to a specific protocol. |
| Administrative Domain | The set of devices, people and processes under the control of the same entity. |
| Boundary of Administrative Control | The boundary between Administrative Domains. |
| Client | A process that a Subject uses to authenticate itself. |
| Client applet | A specific implementation of a Client where the authentication code can be downloaded dynamically, or reside locally on the client, and run in a browser. |
| Client application | A specific implementation of a Client where the authentication code resides on the client and runs as a stand-alone process. |
| Credentials | Data that is presented to establish claimed identity. |
| Domain | A realm of authentication authority. An Authentication Mechanism can authenticate Subjects in one or more domains. |
| Entitlement | A data structure that contains access decision information. A Server uses Entitlements to determine what a Subject can do. |
| Mechanism-Authenticating; Mechanism | An Authentication Mechanism that can authenticate other Authentication Mechanisms as its Subjects. |
| Mechanism Registration | A process that an Authentication Mechanism uses to register itself in the Mechanism Repository. |
| Mechanism Repository | A repository containing information about Authentication Mechanisms. The information includes type of mechanism, its protocol, its strength, and how a Client can contact it. |
| Mechanism Resolution | The process that maps certain information about a Subject (e.g., name and Realm) to a set of Authentication Mechanisms. |

-continued

Definition List 1

| Term | Definition |
|---|---|
| Name Assertion | A signed data structure containing a declaration of identity. A Name Assertion is presented to establish a claimed identity. A Name Assertion is a type of Credential. |
| Protocol Proxy | A process that mediates between two other processes which do not understand each other's protocol. |
| Server | A process that provides service to a Subject through a Client. Servers require Subjects to authenticate themselves. In some cases Servers must also authenticate themselves to the Client/Subject. |
| Server Application | An application that implements the functionality of a Server process. Usually, Server and Server Application are synonymous. |
| Strength | An indication of the rigor of authentication. |
| Subject | A user, application, device, process or any other entity that requires Authentication. |

APPENDIX A

1. This is an example of an authentication request going from the client 22 to the protocol proxy 34.

```
<AuthRequest xmlns="http://ns.s2ml.org/s2ml">
  <ID>urn:PasswordAuthenticatorApplet:e58bd988ee:1</ID>
  <Date>2001-03-29T11:23:773-08:00</Date>
  <Credentials>
    <SecureLogin xmlns="http://sigaba.com/2000/12/sigabanet/fast">
      <Name>logan@sigaba.com</Name>
      <Realm>SIGABA.COM</Realm>
      <A>
BV+2pKUEf0i1I57/TIXlRzSkbIi7+
lhhWhSOuhglBoA0cAo6FxM111RWISG9iB0EEUPC+ppl
hTmzK1OsbVMs/TWGcBPuJVGX5lzhD3Far7Ozx3cIUU50AjGdr+
HVwBt4KJz4E8NrSZKs5fHBoefY3ykaGc KBezeyo5KN+Xx7mWQ=
      </A>
    </SecureLogin>
  </Credentials>
</AuthRequest>
```

2. This is an example of an authentication response from the protocol proxy 34 to the client 22. As you can see, this example contains a name assertion for the protocol proxy 34 (i.e. this is the protocol proxy 34 providing its own name assertion to the client 22).

```
<AuthResponse xmlns="http://ns.s2ml.org/s2ml">
<ID>urn:AuthenticationServlet:e58bd98307:1</ID>
<Date>2001-03-29T11:23:302-08:00</Date>
<InResponseTo>urn:PasswordAuthenticatorApplet:e58bd988ee:1</InResponseTo>
<Result>NotEnoughInfo</Result>
<SecureLoginChallenge xmlns="http://sigaba.com/2000/12/sigabanet/fast">
<ESRP>
  <PasswordDerivative>
    <function>Sigaba SHA-1 Scheme</function>
    <salt>h3D4qARuHQg=</salt>
  </PasswordDerivative>
  <NameAssertion xmlns="http://ns.s2ml.org/s2ml">
    <ID>urn:mechanism/AuthenticationServlet:e58bd98307@SIGABA.COM:0</ID>
    <Issuer>mechanism/AuthenticationServlet:e58bd98307@SIGABA.COM</Issuer>
    <Date>2001-03-29T11:23:840-08:00</Date>
    <Audiences>urn:*</Audiences>
    <ValidityInterval>
      <NotBefore>2001-03-29T10:23:840-08:00</NotBefore>
      <NotAfter>2001-03-30T11:23:840-08:00</NotAfter>
    </ValidityInterval>
    <AuthData>
      <AuthType>Login</AuthType>
<UserHandle>mechanism/AuthenticationServlet:e58bd98307@SIGABA.COM</UserHandle>
        <IdentityToken>
          <dh-public-value xmlns="http://sigaba.com/2001/1/common/security">
<BigInteger>AOmstRClilTNQ8sbRHIrhVxcBK6SAYWdlMMIyR6MJKrSiU/qhZcfYTWSGb0ni9MBDsnkdVB
sa+/DA6PpjI45YhsCLi/ZExOMbqKSwLx2wp84Hu+s5Sa9XA+yTcA/WgzRTF+hjErU1fSImgyYWd7326zA
01D/WMhubYh+XM7nYgKv</BigInteger>
          <BigInteger>Ag==</BigInteger>
          <int>128</int>
<BigInteger>Jfb2Mlif982CLj9sw0/0xgFVGpoICAlJejFE+VCTwymT0TK4HunAtWcSs0PXfYv1agUlye0arQ
+8OX0nKPV5dQjQP3oyuFVybeYHBSPQQD5RTY0PkkFW/EU8iqcxNQcjvMYSu+oT9f60+t78B61vkQvE08
c1NoH5UeoqW8Yyuig=</BigInteger>
          </dh-public-value>
        </IdentityToken>
      </AuthData>
      <Signature xmlns="http://www.w3.org/2000/09/xmldsig#">
        <SignedInfo>
          <CanonicalizationMethod algorithm="http://www.w3.org/TR/2000/CR-xml-
c14n-20001026"></CanonicalizationMethod>
```

-continued

```
        <SignatureMethod algorithm="http://www.w3.org/2000/09/xmldsig#dsa-sha1"></SignatureMethod>
            <Reference uri="#xpointer(../../../..)">
              <Transforms>
                <Transform algorithm="http://www.w3.org/TR/2000/CR-xml-c14n-20001026"></Transform>
              </Transforms>
              <DigestMethod algorithm="http://www.w3.org/2000/09/xmldsig#sha1">
                <DigestValue>X3ZywSCxXHQKP6v9+/6r62/LGHc=</DigestValue>
              </DigestMethod>
            </Reference>
          </SignedInfo>
          <SignatureValue>
    RecJwLPgKpdMGMXlpoi0X8RPGgiQiH/OdzznUMGEpF/eRvb5I1ijmQ==
          </SignatureValue>
          <KeyInfo>
            <KeyValue>
            <DSAKeyValue>
<P>AOmstRClilTNQ8sbRHIrhVxcBK6SAYWdlMMIyR6MJKrSiU/qhZcfYTWSGb0ni9MBDsnkdVBsa+/DA6
PpjI45YhsCLi/ZExOMbqKSwLx2wp84Hu+s5Sa9XA+yTcA/WgzRTF+hjErU1fSImgyYWd7326zA01D/WM
hubYh+XM7nYgKv</P>
            <Q>ANnezYYG5JOCcSNre+pJztsNA2n9</Q>
<G>AKWsWEe8wT1KkMIi+u05wZhODK4U0ZnutBGSY+4LtLl++EW6E5AcEy8dbR9V4HWU32tQUyZwIi
kvChkfRXnjRP1/kPsNiAXUCU1AqxL6f1YZlW5zztXZCBs8iSLqF3EOzoUXm5Kqx5TfoTmCvZiM2nYxL6Q9h
RZKwgJpC3AnzFbu</G>
<Y>BPT2HnTOBMfvFZb8UDn6fQ19gFkOsjGGZGGBRRhw8Kyr06espL34MEavYnwwGW6D1VWbvIuaDH
tUfRv6znkwzg0iCtsSnQ2FLD+rpsEQHok7pz+UWDV4L5u4mhqzWWX3EiJmniOoxQduxqHjsbXm3XMqBy
WmeJOCVRIVeNa7Msw=</Y>
            </DSAKeyValue>
            </KeyValue>
          </KeyInfo>
        </Signature>
      </NameAssertion>
      <B>
U7X7D6daFmx2QTc91hHMjGTQlGHfFIJoorQoPSshiKF8XR0bnOOJP8lGOA8SjEtH7iatb68jJLmhw3vBeG
CV3EEanHQoig1pIsB0gFjOvLHphb+22JEi0CHTBaMmNKijc9/z8U27GnY6BSRbTkXjyMQsqt/AVKo0SxWV
loKdtZw=
      </B>
      <s>ANzxWWHwWH5MCaak8jVVBTA=</s>
    </ESRP>
  </SecureLoginChallenge>
</AuthResponse>
```

3. This is a "continuation" of the request from example 1, above, (i.e., the second message sent from the client 22 to the protocol proxy 34).

```
<AuthRequest xmlns="http://ns.s2ml.org/s2ml">
  <ID>urn:PasswordAuthenticatorApplet:e58bd988ee:2</ID>
  <Date>2001-03-29T11:23:651-08:00</Date>
  <InResponseTo>urn:AuthenticationServlet:e58bd98307:1</InResponseTo>
  <Credentials>
    <SecureLogin xmlns="http://sigaba.com/2000/12/sigabanet/fast">
      <ESRP>
        <r>OUqDVi6xfDquAJJoiX6TMQ==</r>
        <proof>Kq4wU50gR8lmM1LWlgsRX6AjdWI=</proof>
      </ESRP>
      <encrypted>
Jj2hQq0rgYLmuX2Nvml3pdz0m4pADLh7C1AtKDcbjkLWjL3XRbPTRMjEtqe5/xDzFTpvUr/QbMs1PAs46a
wwvqHJrIJJj33DDObHa0oFdsJkcuk8oBwoHgswu9UKNhD2+TYAY5A1XVHYRGgDPw2fNw==
      </encrypted>
    </SecureLogin>
  </Credentials>
  <Signature xmlns="http://www.w3.org/2000/09/xmldsig#">
    <SignedInfo>
      <CanonicalizationMethod algorithm="http://www.w3.org/TR/2000/CR-xml-c14n-20001026"></CanonicalizationMethod>
      <SignatureMethod algorithm="http://www.w3.org/2000/09/xmldsig#hmac-sha1"></SignatureMethod>
        <Reference uri="#xpointer(../../../..)">
          <Transforms>
            <Transform algorithm="http://www.w3.org/TR/2000/CR-xml-c14n-20001026"></Transform>
```

-continued

```
        </Transforms>
        <DigestMethod algorithm="http://www.w3.org/2000/09/xmldsig#sha1">
          <DigestValue>6b2BeIg9NdacKv3icawD6Gc5sQI=</DigestValue>
        </DigestMethod>
      </Reference>
    </SignedInfo>
    <SignatureValue>InZ21+ccWFSKb+e8vp8FRmF+HfE=</SignatureValue>
  </Signature>
</AuthRequest>
```

4. This is the second response from the protocol proxy 34 to the client 22. This response contains encrypted name assertion and entitlements on the <encrypted> element.

```
<AuthResponse xmlns="http://ns.s2ml.org/s2ml">
  <ID>urn:AuthenticationServlet:e58bd98307:2</ID>
  <Date>2001-03-29T11:23:082-08:00</Date>
  <InResponseTo>urn:PasswordAuthenticatorApplet:e58bd988ee:2</InResponseTo>
  <Result>Success</Result>
  <ESRP xmlns="http://sigaba.com/2000/12/sigabanet/fast">
    <proof>fpOoMrfTFPtixO+Py/VnL2wYbK4=</proof>
  </ESRP>
  <encrypted xmlns="http://sigaba.com/2000/12/sigabanet/fast">
  +hTqqvIfr5fjWDnmezmdSPC8ZOMFnTbheg7hRjgL5X8pTzQ5kF/orOxnzx3x9S/J
  ... [Encrypted data omited for brevity here.] ...
  p9BPevCysg6Yq8iWk3Y6XWHH5/lrzavFn64S5EzLpgGriKySupof4EvOfrdPaP33
  </encrypted>
  <Signature xmlns="http://www.w3.org/2000/09/xmldsig#">
    <SignedInfo>
      <CanonicalizationMethod algorithm="http://www.w3.org/TR/2000/CR-xml-c14n-20001026"></CanonicalizationMethod>
      <SignatureMethod algorithm="http://www.w3.org/2000/09/xmldsig#hmac-sha1"></SignatureMethod>
      <Reference uri="#xpointer(../../../..)">
        <Transforms>
          <Transform algorithm="http://www.w3.org/TR/2000/CR-xml-c14n-20001026"></Transform>
        </Transforms>
        <DigestMethod algorithm="http://www.w3.org/2000/09/xmldsig#sha1">
          <DigestValue>Rke9WGLhQ1BwfsyAqHV2p5J2Kz8=</DigestValue>
        </DigestMethod>
      </Reference>
    </SignedInfo>
    <SignatureValue>wvJCJcGhQ/W3UKhoJAGnS2T8nK8=</SignatureValue>
  </Signature>
</AuthResponse>
```

5. This is simply a clear-text version of the <encrypted> element in example 4, above.

```
<NameAssertion xmlns="http://ns.s2ml.org/s2ml">
  <ID>urn:mechanism/SigAuthServlet:e587bfe6c7@SIGABA.COM:3d</ID>
  <Issuer>mechanism/SigAuthServlet:e587bfe6c7@SIGABA.COM</Issuer>
  <Date>2001-03-29T11:19:980-08:00</Date>
  <Audiences>urn:*</Audiences>
  <ValidityInterval>
    <NotBefore>2001-03-29T10:19:980-08:00</NotBefore>
    <NotAfter>2001-03-29T19:19:980-08:00</NotAfter>
  </ValidityInterval>
  <AuthData>
    <AuthType>Login</AuthType>
    <UserHandle>logan@sigaba.com@SIGABA.COM</UserHandle>
<Aliases>logan@gedanken.org@SIGABA.COM,logan@sigaba.com@SIGABA.COM,enterprise@sigaba.com@SIGABA.COM,engineering@sigaba.com@SIGABA.COM,enterprise-tech@sigaba.com@SIGABA.COM,all@sigaba.com@SIGABA.COM,fastlist@sigaba.com@SIGABA.COM</Aliases>
    <IdentityToken>
```

-continued

```
      <dh-public-value xmlns="http://sigaba.com/2001/1/common/security">
<BigInteger>AOmstRClilTNQ8sbRHIrhVxcBK6SAYWdlMMIyR6MJKrSiU/qhZcfYTWSGb0ni9MBDsnkdVB
sa+/DA6PpjI45YhsCLi/ZExOMbqKSwLx2wp84Hu+s5Sa9XA+yTcA/WgzRTF+hjErU1fSImgyYWd7326zA
01D/WMhubYh+XM7nYgKv</BigInteger>
        <BigInteger>Ag==</BigInteger>
        <int>128</int>
<BigInteger>AMGVIvdII0GwAKE05VLkECE9CrgYLXtNfPxPzNgBLQIpWCqzXvnP29itL6zkoczpS1Oi+zIL9
RFxI37MCkvuNxqCtIykq4XGLAf/PeIPEWNPz9xK3QvpkBr1yQChIvTuTktLTM+/sQePUwk0LMt/Sy43QDX
hyP4Awytucc29k21l</BigInteger>
      </dh-public-value>
    </IdentityToken>
  </AuthData>
  <Signature xmlns="http://www.w3.org/2000/09/xmldsig#">
    <SignedInfo>
      <CanonicalizationMethod algorithm="http://www.w3.org/TR/2000/CR-xml-c14n-
20001026"></CanonicalizationMethod>
      <SignatureMethod algorithm="http://www.w3.org/2000/09/xmldsig#dsa-
sha1"></SignatureMethod>
      <Reference uri="#xpointer(../../../..)">
        <Transforms>
         <Transform algorithm="http://www.w3.org/TR/2000/CR-xml-c14n-
20001026"></Transform>
        </Transforms>
        <DigestMethod algorithm="http://www.w3.org/2000/09/xmldsig#sha1">
          <DigestValue>BnsirjWjSnsNx+ui75eSnCfLK/4=</DigestValue>
        </DigestMethod>
      </Reference>
    </SignedInfo>
<SignatureValue>hjRVhP2sQAwnOZcj/w7WnDxZJuktp2IYX3wF3j8sAEoUkLxuxAkOSA==</SignatureValue>
    <KeyInfo>
      <KeyValue>
      <DSAKeyValue>
<P>AOmstRClilTNQ8sbRHIrhVxcBK6SAYWdlMMIyR6MJKrSiU/qhZcfYTWSGb0ni9MBDsnkdVBsa+/DA6
PpjI45YhsCLi/ZExOMbqKSwLx2wp84Hu+s5Sa9XA+yTcA/WgzRTF+hjErU1fSImgyYWd7326zA01D/WM
hubYh+XM7nYgKv</P>
        <Q>ANnezYYG5JOCcSNre+pJztsNA2n9</Q>
<G>AKWsWEe8wT1KkMIi+u05wZhODK4U0ZnutBGSY+4LtLl++EW6E5AcEy8dbR9V4HWU32tQUyZwIi
kvChkfRXnjRP1/kPsNiAXUCU1AqxL6f1YZlW5zztXZCBs8iSLqF3EOzoUXm5Kqx5TfoTmCvZiM2nYxL6Q9h
RZKwgJpC3AnzFbu</G>
<Y>BPT2HnTOBMfvFZb8UDn6fQ19gFkOsjGGZGGBRRhw8Kyr06espL34MEavYnwwGW6D1VWbvIuaDH
tUfRv6znkwzg0iCtsSnQ2FLD+rpsEQHok7pz+UWDV4L5u4mhqzWWX3EiJmniOoxQduxqHjsbXm3XMqBy
WmeJOCVRIVeNa7Msw=</Y>
      </DSAKeyValue>
      </KeyValue>
    </KeyInfo>
  </Signature>
</NameAssertion>
<Entitlement xmlns="http://ns.s2ml.org/s2ml">
  <ID>urn:mechanism/SigAuthServlet:e587bfe6c7@SIGABA.COM:3d:0</ID>
  <Issuer>mechanism/SigAuthServlet:e587bfe6c7@SIGABA.COM</Issuer>
  <Date>2001-03-29T11:19:980-08:00</Date>
  <Audiences>urn:*</Audiences>
  <ValidityInterval>
    <NotBefore>2001-03-29T10:19:980-08:00</NotBefore>
    <NotAfter>2001-03-29T19:19:980-08:00</NotAfter>
  </ValidityInterval>
<DependsOn>urn:mechanism/SigAuthServlet:e587bfe6c7@SIGABA.COM:3d</DependsOn>
  <AzData>
   <ks-info xmlns="http://sigaba.com/2000/12/sigabanet/sigauth">
     <ks-info host="minnie.ironsite.com" id="0" ip="63.202.162.58"></ks-info>
   </ks-info>
  </AzData>
  <Signature xmlns="http://www.w3.org/2000/09/xmldsig#">
    <SignedInfo>
      <CanonicalizationMethod algorithm="http://www.w3.org/TR/2000/CR-xml-c14n-
20001026"></CanonicalizationMethod>
      <SignatureMethod algorithm="http://www.w3.org/2000/09/xmldsig#dsa-
sha1"></SignatureMethod>
      <Reference uri="#xpointer(../../../..)">
        <Transforms>
         <Transform algorithm="http://www.w3.org/TR/2000/CR-xml-c14n-
20001026"></Transform>
        </Transforms>
        <DigestMethod algorithm="http://www.w3.org/2000/09/xmldsig#sha1">
          <DigestValue>1yMLZu/99bWEnSIfV1soodcddTk=</DigestValue>
        </DigestMethod>
      </Reference>
    </SignedInfo>
```

-continued

```
<SignatureValue>I6094fFSSCdbRS3HSEEjf2nlyDeapzMB/NHjJs5y9HX9XvhwfVgOoQ==</SignatureValue>
    <KeyInfo>
      <KeyValue>
        <DSAKeyValue>
<P>AOmstRClilTNQ8sbRHIrhVxcBK6SAYWdlMMIyR6MJKrSiU/qhZcfYTWSGb0ni9MBDsnkdVBsa+/DA6
PpjI45YhsCLi/ZExOMbqKSwLx2wp84Hu+s5Sa9XA+yTcA/WgzRTF+hjErU1fSImgyYWd7326zA01D/WM
hubYh+XM7nYgKv</P>
        <Q>ANnezYYG5JOCcSNre+pJztsNA2n9</Q>
<G>AKWsWEe8wT1KkMIi+u05wZhODK4U0ZnutBGSY+4LtLl++EW6E5AcEy8dbR9V4HWU32tQUyZwIi
kvChkfRXnjRP1/kPsNiAXUCU1AqxL6f1YZlW5zztXZCBs8iSLqF3EOzoUXm5Kqx5TfoTmCvZiM2nYxL6Q9h
RZKwgJpC3AnzFbu</G>
<Y>BPT2HnTOBMfvFZb8UDn6fQ19gFkOsjGGZGGBRRhw8Kyr06espL34MEavYnwwGW6D1VWbvIuaDH
tUfRv6znkwzg0iCtsSnQ2FLD+rpsEQHok7pz+UWDV4L5u4mhqzWWX3EiJmniOoxQduxqHjsbXm3XMqBy
WmeJOCVRIVeNa7Msw=</Y>
        </DSAKeyValue>
      </KeyValue>
    </KeyInfo>
  </Signature>
</Entitlement>
```

What is claimed is:

1. A system for authenticating a subject residing in a subject domain on a network to a server application residing in a server domain on the network, wherein an authentication mechanism residing in an authentication domain on the network affects the service provided by the server application, the system comprising:
a client for communicating with other components of the system and for authenticating the subject to other components of the system by providing client credentials on behalf of the subject, wherein said client also resides in the subject domain, wherein the subject is selected from humans, client applications and applets; and
a protocol proxy for communicating between said client and the authentication mechanism and for authenticating said client based on said client credentials, for obtaining from the authentication mechanism temporary credentials for said client to access the server application, and for creating from said temporary credentials an authentication name assertion allowing said client to access the server application.

2. The system of claim 1, wherein said protocol proxy resides in the authentication domain on the network.

3. The system of claim 1, wherein said protocol proxy uses a standard security protocol to communicate with said client and a mechanism-specific protocol to communicate with the authentication mechanism.

4. The system of claim 1, wherein at least one of said client and said protocol proxy authenticates using SRP protocol.

5. The system of claim 1, wherein said protocol proxy produces a signed name assertion.

6. The system of claim 5, wherein said signed name assertion is contained in a S2ML document.

7. The system of claim 5, wherein said protocol proxy further produces a signed name entitlement.

8. The system of claim 1, wherein said protocol proxy uses a proxy name assertion to authenticate itself to the client.

9. The system of claim 1, further comprising an adapter for receiving said authentication name assertion, recreating said credentials, and permitting said client to access the server application based on said credentials.

10. A method for authenticating a subject residing in a subject domain on a network to a server application residing in a server domain on the network, wherein an authentication mechanism residing in an authentication domain on the network affects the service provided by the server application, the method comprising the steps:
(a) authenticating the subject to a protocol proxy with a client by providing subject credentials on behalf of the subject, wherein the subject is selected from humans, client applications and applets;
(b) obtaining a name assertion from said protocol proxy via the authentication mechanism which will allow said client to access the server application, thereby mediating between said protocol proxy and the authentication mechanism to permit the subject to access the server application via said client;
(c) creating an authentication name assertion with said protocol proxy based on said subject credentials which will allow said client to access the server application;
(d) communicating said authentication name assertion to said client; and
(e) communicating said authentication name assertion to the server application.

11. The method of claim 10, wherein said protocol proxy resides in the authentication domain on the network.

12. The method of claim 10, wherein said protocol proxy uses a standard security protocol to communicate with said client and a mechanism-specific protocol to communicate with the authentication mechanism.

13. The method of claim 10, wherein at least one of said client and said protocol proxy authenticates using SRP protocol.

14. The method of claim 10, wherein said protocol proxy produces a signed name assertion.

15. The method of claim 14, wherein said signed name assertion is contained in a S2ML document.

16. The method of claim 14, wherein said protocol proxy further produces a signed name entitlement.

17. The method of claim 10, wherein said protocol proxy uses a proxy name assertion to authenticate itself to the client.

18. The method of claim 10, further comprising an adapter, and the method further comprising:
receiving said authentication name assertion with said adapter;
recreating said credentials with said adapter; and
permitting said client to access the server application based on said credentials.

* * * * *